(12) United States Patent
KC

(10) Patent No.: US 10,869,089 B1
(45) Date of Patent: Dec. 15, 2020

(54) SYSTEMS AND METHODS FOR PREVENTING DISPLAY OF BLOCKED CONTENT

(71) Applicant: Symantec Corporation, Mountain View, CA (US)

(72) Inventor: Santhanakrishnan KC, Chennai (IN)

(73) Assignee: NORTONLIFELOCK, INC., Tempe, AZ (US)

( * ) Notice: Subject to any disclaimer, the term of this patent is extended or adjusted under 35 U.S.C. 154(b) by 0 days.

(21) Appl. No.: 16/139,342

(22) Filed: Sep. 24, 2018

(51) Int. Cl.
*H04N 21/454* (2011.01)
*H04N 21/43* (2011.01)
*H04N 21/475* (2011.01)
*H04N 21/45* (2011.01)

(52) U.S. Cl.
CPC ....... *H04N 21/454* (2013.01); *H04N 21/4302* (2013.01); *H04N 21/4532* (2013.01); *H04N 21/4756* (2013.01)

(58) Field of Classification Search
CPC ........ H04N 21/4542; H04N 21/454–21/45457
See application file for complete search history.

(56) References Cited

U.S. PATENT DOCUMENTS

| | | | |
|---|---|---|---|
| 5,548,345 A * | 8/1996 | Brian .................. | H04N 5/44543 345/169 |
| 10,237,599 B1 * | 3/2019 | Gravino ............. | H04N 21/6118 |
| 2002/0095673 A1 * | 7/2002 | Leung ................ | H04N 21/4755 725/25 |
| 2003/0172377 A1 * | 9/2003 | Johnson ............... | H04N 21/422 725/25 |
| 2009/0133049 A1 * | 5/2009 | Bradley ................. | H04N 7/162 725/28 |
| 2011/0047577 A1 * | 2/2011 | Modi .................. | H04N 21/4755 725/47 |
| 2011/0271297 A1 * | 11/2011 | Mears ................ | H04N 5/44543 725/28 |
| 2012/0117221 A1 * | 5/2012 | Katpelly ............ | H04N 21/4135 709/224 |
| 2015/0082335 A1 * | 3/2015 | Cobb .................. | H04N 21/4542 725/28 |
| 2015/0188886 A1 * | 7/2015 | Mityagin ............ | H04L 63/0263 726/1 |
| 2017/0228550 A1 * | 8/2017 | Harb .................. | H04N 21/4751 |

\* cited by examiner

*Primary Examiner* — Robert J Hance
(74) *Attorney, Agent, or Firm* — FisherBroyles, LLP

(57) ABSTRACT

The disclosed computer-implemented method for preventing display of blocked content may include (i) displaying, by the computing device, content to a user, (ii) receiving, from a user, an indication to block the content, (iii) adding the content to a block list, (iv) receiving, at a later time, the content to display to the user, (v) determining the content is on the block list, and (vi) in response to determining the content is on the block list, performing a security action to prevent display of the content. Various other methods, systems, and computer-readable media are also disclosed.

20 Claims, 10 Drawing Sheets

SYSTEMS AND METHODS FOR PREVENTING DISPLAY OF BLOCKED CONTENT

BACKGROUND

Different types of computing devices may receive and displaying digital media content. For example, mobile computing devices, such as smart phones, tablets, smart watches, and other wearable devices, have the capability to receive and display digital media content, regardless of their location, if they have access to a wireless network. These devices may be used in many different settings and scenarios. In one example, digital content may be streamed to a device used in a public setting, such as a park or restaurant. However, despite the availability to stream the content to the mobile devices, users may not have the ability to control which portions of the content to display. For example, a parent may wish to show a movie to a child on a mobile device. However, the movie may have a portion that the parent does not wish to show the child. For example, the parent may not wish to show the child a specific advertisement or scene in the movie that may be displayed during playback of the movie. Existing systems may permit the parent to fast forward or otherwise skip over the portion of the movie, which requires immediate and direct intervention by the parent while the child is viewing the movie. The parent must be aware of where the section of the movie they wish to skip is in the movie and be diligent in monitoring the progress of the movie in order to manually skip over the section. If the parent is not able to quickly skip the segment of the movie at the correct time, the child may be exposed to the segment, regardless of the efforts of the parent. The instant disclosure, therefore, identifies and addresses a need for systems and methods for preventing display of blocked content.

SUMMARY

As will be described in greater detail below, the instant disclosure describes various systems and methods for preventing display of blocked content.

In one example, a method for preventing display of blocked content may include (i) displaying, by the computing device, content to a user, (ii) receiving, from a user, an indication to block the content, (iii) adding the content to a block list, (iv) receiving, at a later time, the content to display to the user, (v) determining the content is on the block list, and (vi) in response to determining the content is on the block list, performing a security action to prevent display of the content.

In some examples, the security action may include displaying, on the computing device, alternative content in lieu of the content on the block list. The alternative content may include user-specified media content. Adding the content to the block list may include detecting an identifier associated with the content and adding the identifier to the block list. In some examples, adding the content to the block list may include generating a unique identifier based on data in the content and adding the unique identifier to the block list. The method may further include associating a rating or comment to the content on the block list, wherein the rating or comment is provided by the user. In some examples, the computing device may be associated with a user account, a different computing device may be associated with the user account, and the method may include synchronizing, based on the user account, the block list on computing device and the different computing device. The method may include importing the block list from a remote computing device, wherein remote computing device is associated with a different user account. The different user account may be associated with the user account through a social media platform or through a contact list on the computing device.

In one embodiment, a system for preventing display of blocked content may include at least one physical processor and physical memory that includes computer-executable instructions that, when executed by the physical processor, cause the physical processor to (i) display content to a user of a computing device, (ii) receive, from a user, an indication to block the content, (iii) add the content to a block list, (iv) receive, at a later time, the content to display to the user, (v) determine the content is on the block list, and (vi) in response to determining the content is on the block list, perform a security action to prevent display of the content.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) display content to a user of a computing device, (ii) receive, from a user, an indication to block the content, (iii) add the content to a block list, (iv) receive, at a later time, the content to display to the user, (v) determine the content is on the block list, and (vi) in response to determining the content is on the block list, performing a security action to prevent display of the content.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
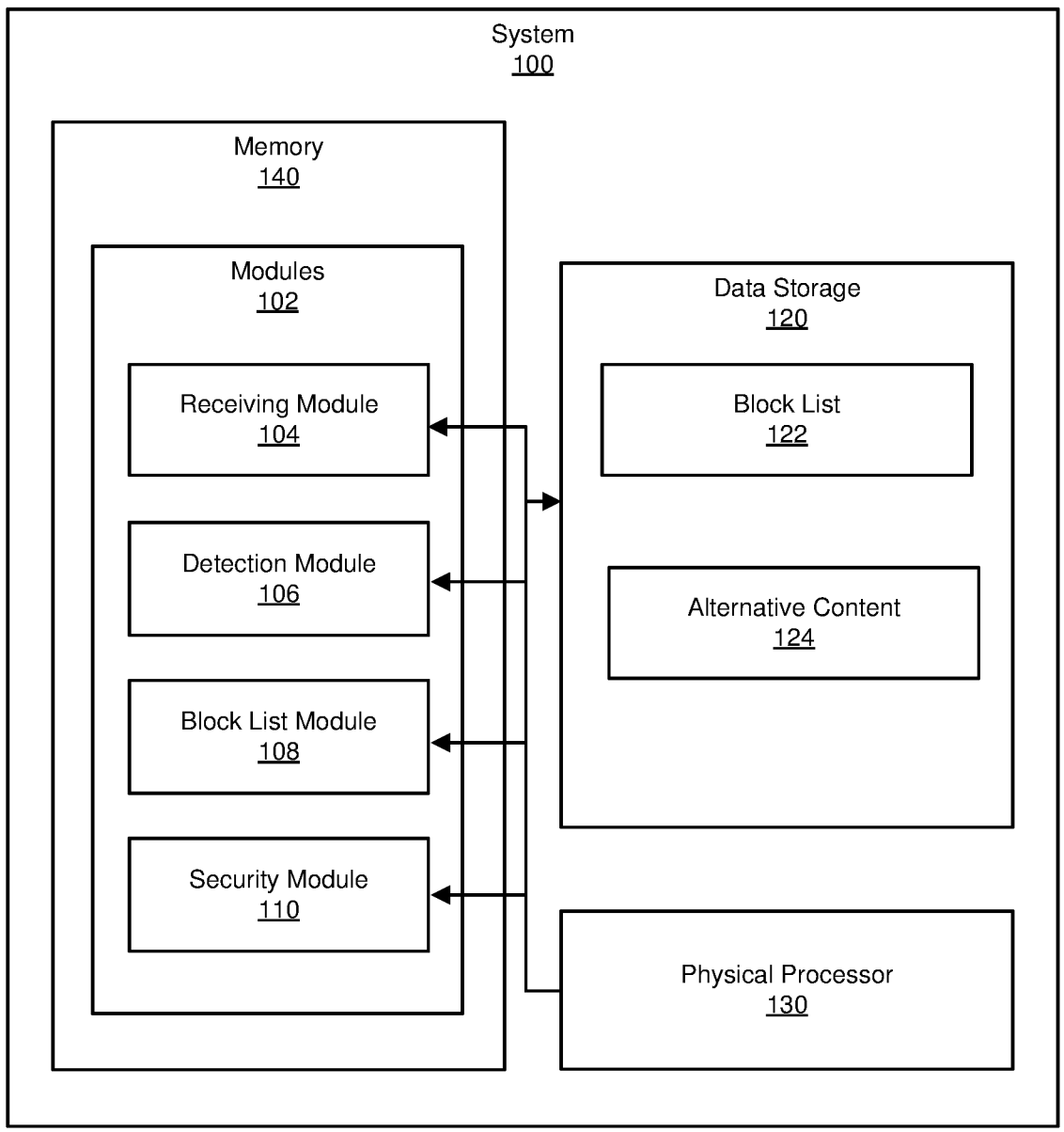
FIG. 1 is a block diagram of an example system for preventing display of blocked content.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for preventing display of blocked content. Existing solutions for preventing display of blocked content may require manual intervention by the user, which may be prone to mishaps based on diligence and timing on the part of the user. The systems and methods described herein are directed to maintaining a list of blocked content, as indicated by a user, and using the list to prevent the display of the content on the computing devices. In some examples, the block list may be synchronized across devices associated with the same user account. The block list may also be shared with other users. The systems described herein may identify content identified to be blocked and, in future encounters, may execute a security action, such as displaying alternative content in lieu of the content on the block list when content on the blocked list is detected.

Figure 2:
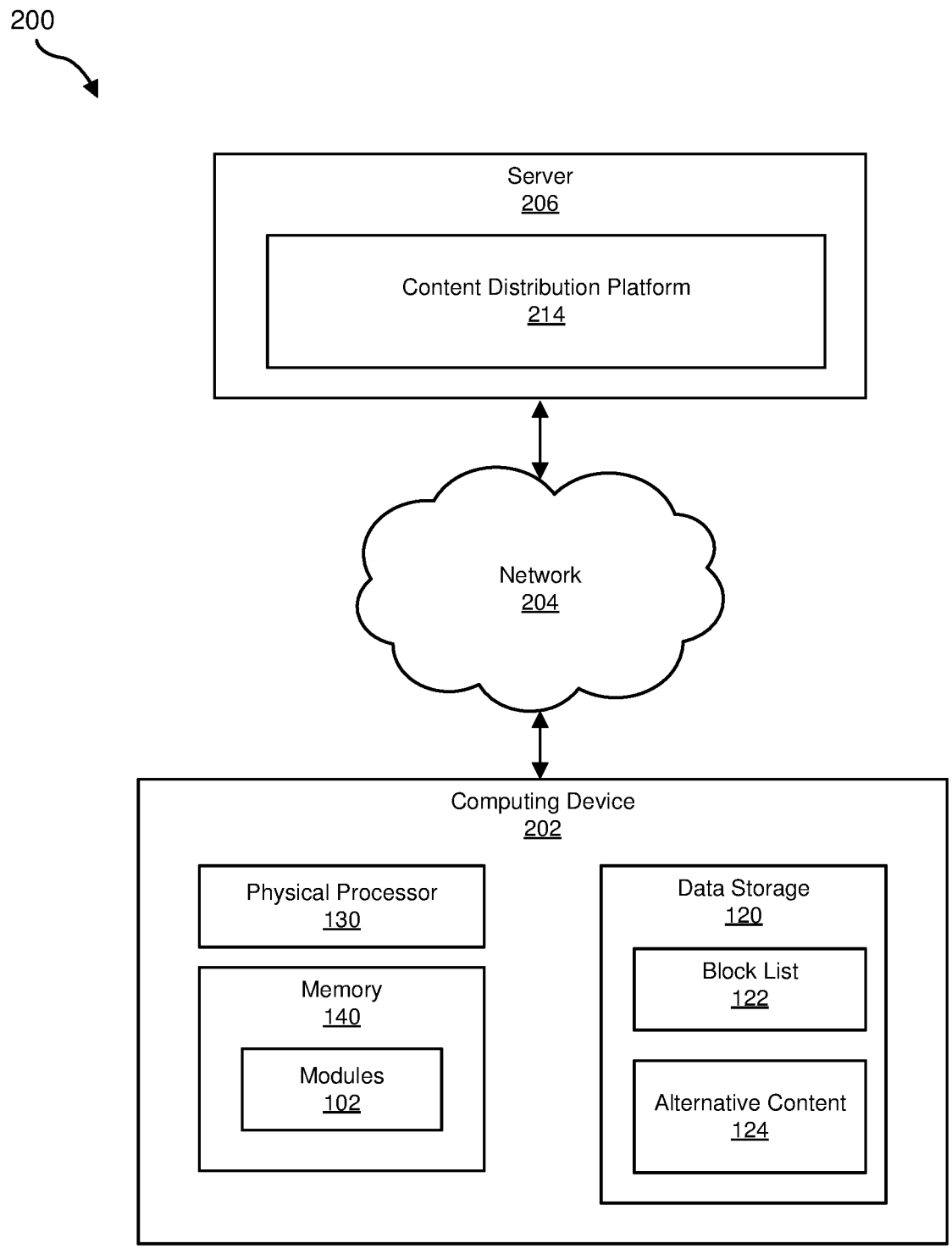
FIG. 2 is a block diagram of an additional example system for preventing display of blocked content.

The following will provide, with reference to FIGS. 1-2, detailed descriptions of example systems for preventing display of blocked content. Detailed descriptions of corresponding computer-implemented methods will also be provided in connection with FIGS. 3-5 and 7-8. A detailed description of data flow through the example system for preventing display of blocked content, will also be provided in connection with FIG. 6. In addition, detailed descriptions of an example computing system and network architecture capable of implementing one or more of the embodiments described herein will be provided in connection with FIGS. 9 and 10, respectively.

FIG. 1 is a block diagram of an example system 100 for preventing display of blocked content. As illustrated in this figure, example system 100 may include one or more modules 102 for performing one or more tasks. As will be explained in greater detail below, modules 102 may include a receiving module 104, a detecting module 106, a block list module 108, and a security module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate preventing display of blocked content. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include data storage 120. The data storage 120 generally represents any type or form of computing device capable of data storage. In one example, the data storage 120 may store the block list 122 and/or the alternative content 124.

Example system 100 in FIG. 1 may be implemented in a variety of ways. For example, all or a portion of the example system 100 may represent portions of the example system 200 in FIG. 2. As shown in FIG. 2, the example system 200 may include a computing device 202 in communication with a server 206 via a network 204. In one example, all or a portion of the functionality of the modules 102 may be performed by the computing device 202, the server 206, and/or any other suitable computing system. As will be described in greater detail below, one or more of the modules 102 from FIG. 1 may, when executed by at least one processor of the computing device 202 and/or the server 206, enable the computing device 202 and/or the server 206 to prevent display of blocked content. For example, and as will be described in greater detail below, one or more of the modules 102 may cause the computing device 202 and/or the server 206 to recite steps of method claim using FIG. 2

The computing device 202 generally represents any type or form of computing device capable of reading computer-executable instructions. For example, the computing device 202 may include an endpoint device (e.g., a mobile computing device) running client-side security software. Additional examples of the computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The server 206 generally represents any type or form of computing device that is capable of reading computer-executable instructions. In one example, the server 206 may be a server hosting a content distribution platform 214 to facilitate distribution of content, such as digital media content, to computing devices, such as the computing device 202. Additional examples of the server 206 include, without limitation, security servers, application servers, web servers, storage servers, and/or database servers configured to run certain software applications and/or provide various security, web, storage, and/or database services. Although illustrated as a single entity in FIG. 2, the server 206 may include and/or represent a plurality of servers that work and/or operate in conjunction with one another.

The network 204 generally represents any medium or architecture capable of facilitating communication or data transfer. In one example, the network 204 may facilitate communication between the computing device 202 and the server 206. In this example, the network 204 may facilitate communication or data transfer using wireless and/or wired connections. Examples of the network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
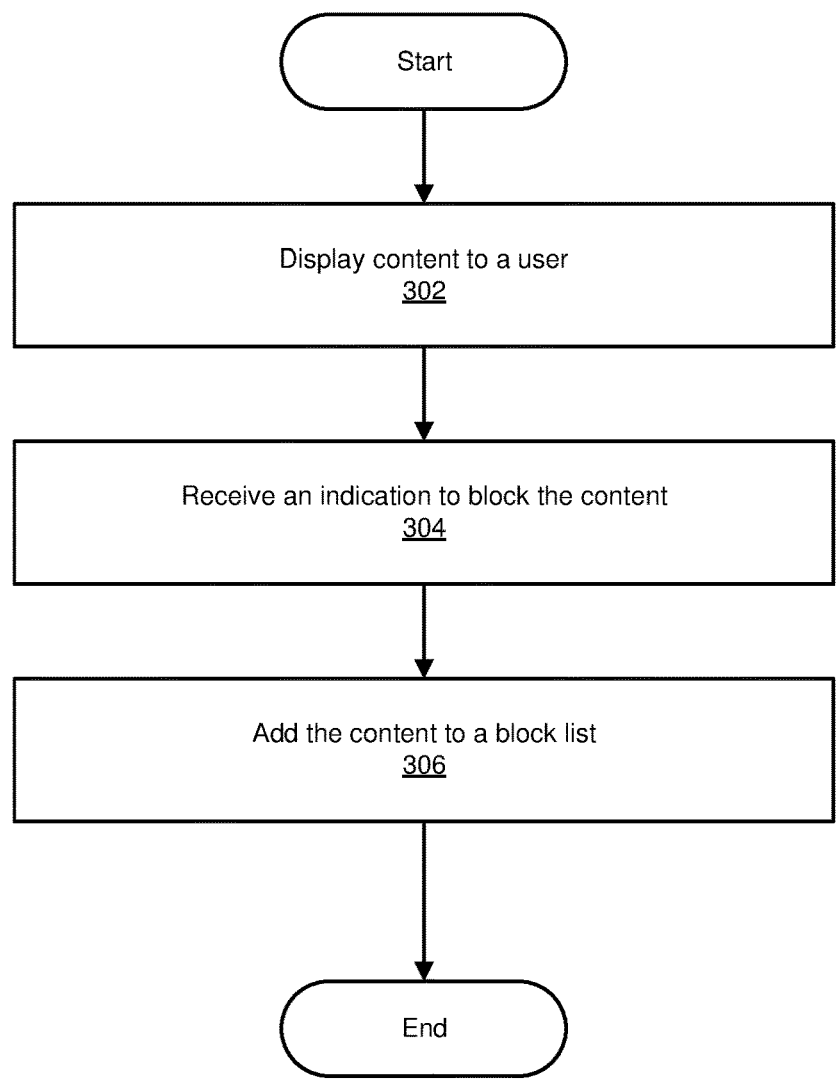
FIG. 3 is a flow diagram of an example method for adding content to a block list.

FIG. 3 is a flow diagram of an example computer-implemented method 300 for adding content to a block list 122. The steps shown in FIG. 3 may be performed by any suitable computer-executable code and/or computing system, including the system 100 in FIG. 1, the system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As an illustrative example of method 300, the content received by the computing device 202, such as a set-top box or other computing device capable of receiving and displaying digital content, may be an advertisement to be displayed with other content, such as a television show or movie. A user of the computing device 202 may determine that the content should be blocked, for example, because it is inappropriate for display to young children (e.g., a movie trailer for a horror movie). The systems described herein may enable the user to identify the content to add to the block list 122 to prevent the display of the content on the computing device 202 in the future.

As illustrated in FIG. 3, at step 302 one or more of the systems described herein may display content to the user. The systems described herein may display content to a user in any suitable manner. For example, the receiving module 104 may, as part of the computing device 202 in FIG. 2, may receive content from the content distribution platform 214. The receiving module 104 may process the received content and facilitate presentation of the content to the user of the computing device 202.

The term "content," as used herein, may generally refer to one or more digital media files that may be displayed on the computing device 202. Examples of content may include, without limitation, digital images, digital video, video game, web pages, digital audio, and/or electronic books. Content may also include digital advertisements, such as commercials, previews, or other marketing materials.

At step 304, one or more the systems described herein may receive an indication to block the content. The systems described herein may receive an indication to block the content in any suitable manner. For example, the receiving module 104 may receive an indication to block the content in response to a user input. The indication to block the content may be received in response to a user navigating to a menu on the computing device 202 using, for example, a touchscreen interface, a remote control device associated with the computing device 202, or other user interface, to specify to block the content or a portion of the content. In some examples, the user input may also include a rating or comment to associate with the content to be placed on the blocked list 122. For example, the user may specify a rating (e.g., on a scale of 1-5) indicating how strongly they feel about the content being block (e.g., mildly dislike, strongly dislike, etc.). In some examples, the user may indicate categories or tags to associate with the content to be added to the block list 122. The categories or tags may be used to later reorganize or create new block lists 122 (e.g., food related, entertainment related, etc.). In some examples, the user may provide a comment to associate with the content being blocked. The comments may indicate notes that may be useful for the user or other users (e.g., if the block list 122 is shared) to review why the content was blocked or to indicate what the content is about.

At step 306, one or more systems described herein may add the content to the block list 122. The systems described herein may add the content to the block list 122 in any suitable manner. For example, the block list module 108 may receive, from the detection module 106, data associated with the content, such as an identifier, to use to add the content to the block list 122, as will be discussed further with relation to FIG. 5.

Figure 4:
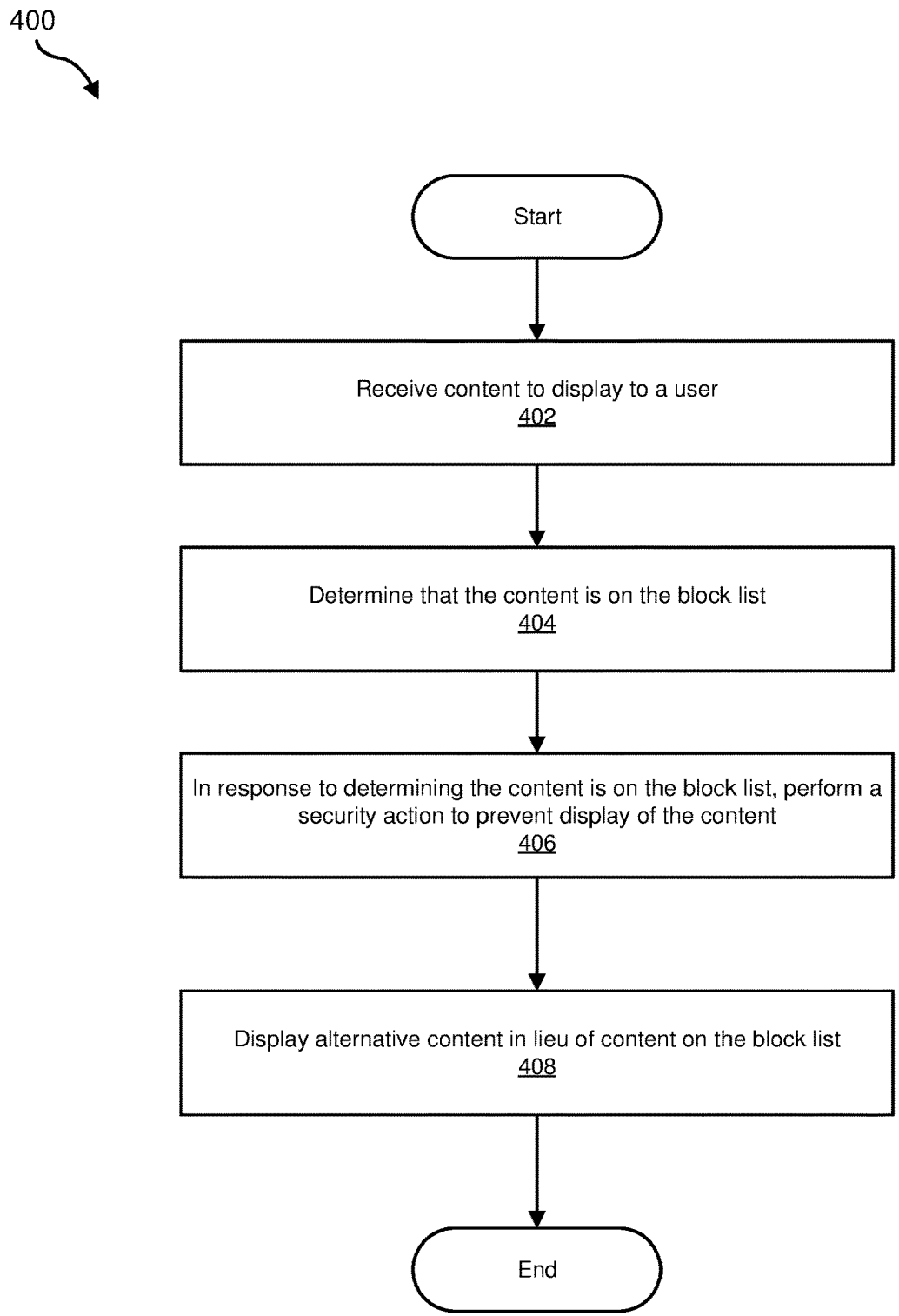
FIG. 4 is a flow diagram of an example method for preventing display of blocked content.

FIG. 4 is a flow diagram of an example method 400 for preventing display of blocked content. The steps shown in FIG. 4 may be performed by any suitable computer-executable code and/or computing system, including the system 100 in FIG. 1, the system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

At step 402, one or more systems described herein may receive content to display to a user. The systems described herein may perform step 402 in any suitable manner. For example, content may be received by the receiving module 104 from the content distribution platform 214. The content may be transmitted to the detection module 106. At step 404, one or more systems described herein may determine that the content is on the block list 122. The systems described herein may determine that the content is on the block list 122 in any suitable manner. For example, for example, the detection module 106 may process the content to determine if the content is associated with an identifier. The identifier may be an alphanumeric string, which may include data associated with the content, such as a title, publisher, date published, or the like. If the content is associated with an identifier, the detection module 106 may obtain the identifier from the content and compare the identifier to the block list 122 to determine whether the content is on the block list 122.

In some examples, the content may not be associated with an identifier. The detection module 106 may process the content to generate a unique identifier for the content and compare the identifier to the block list 122. In some examples, the detection module 106 may process the content and generate a digital video fingerprint using known techniques. Digital video fingerprints may be generated for content by identifying, extracting, and then summarizing characteristic components of content (e.g., a video recording), enabling that content to be uniquely identified by its resultant fingerprint. The digital video fingerprint generated for the content may be compare to the block list 122.

At step 406, one or more systems described herein may, in response to determining the content is on the block list 122, perform a security action to prevent display of the content on the computing device 202. The systems described herein may perform the security action to prevent display of the content on the computing device 202 in any suitable manner. For example, security module 110 may display alternative content 124 in lieu of content on the block list 122. In some examples, the alternative content 124 may be an empty screen. In some examples, the alternative content 124 may be user-specified media content, such as picture, videos, or other content that may be displayed in lieu of the blocked content.

Figure 5:
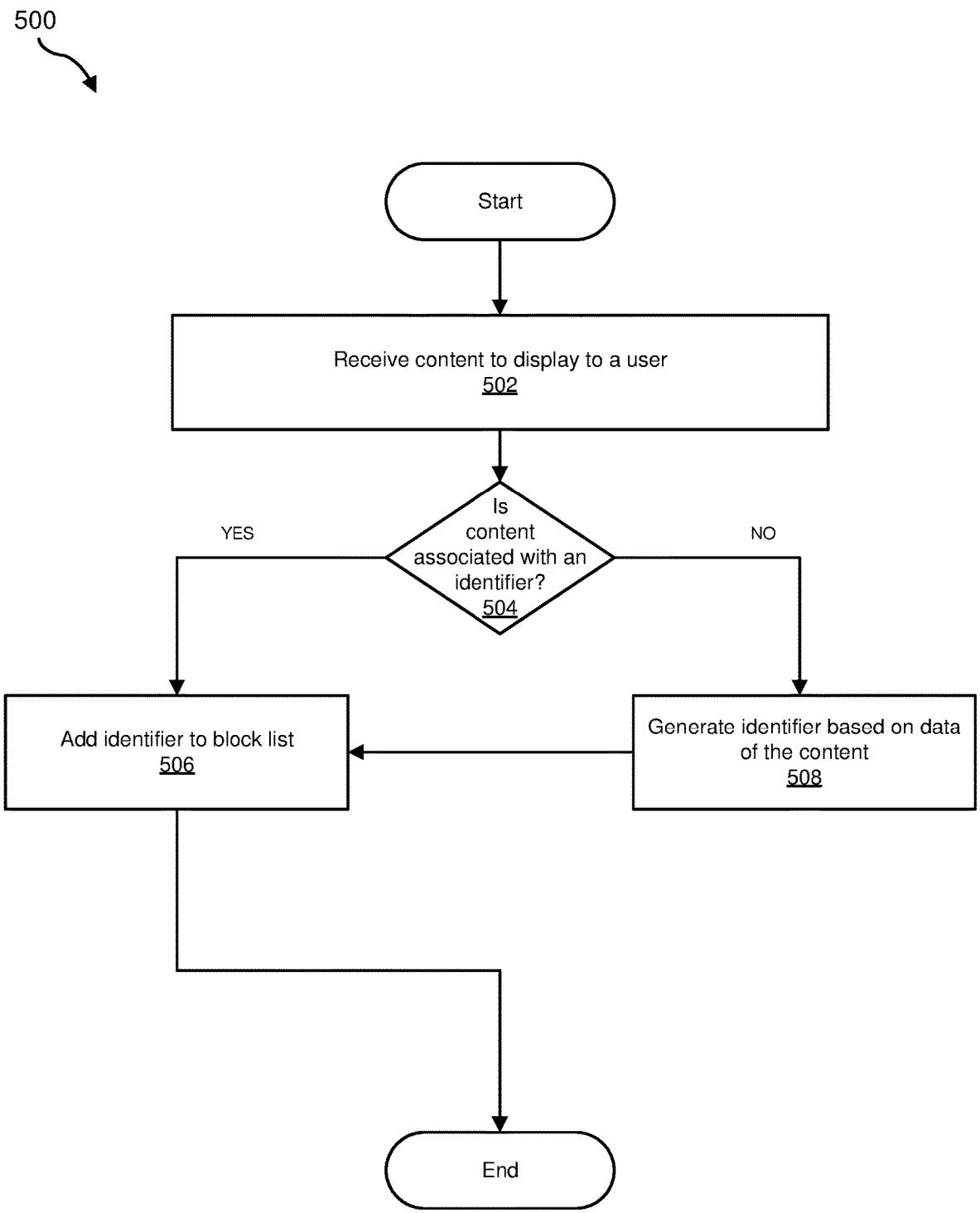
FIG. 5 is a flow diagram of an example method for how content is added to a block list.
Figure 6:
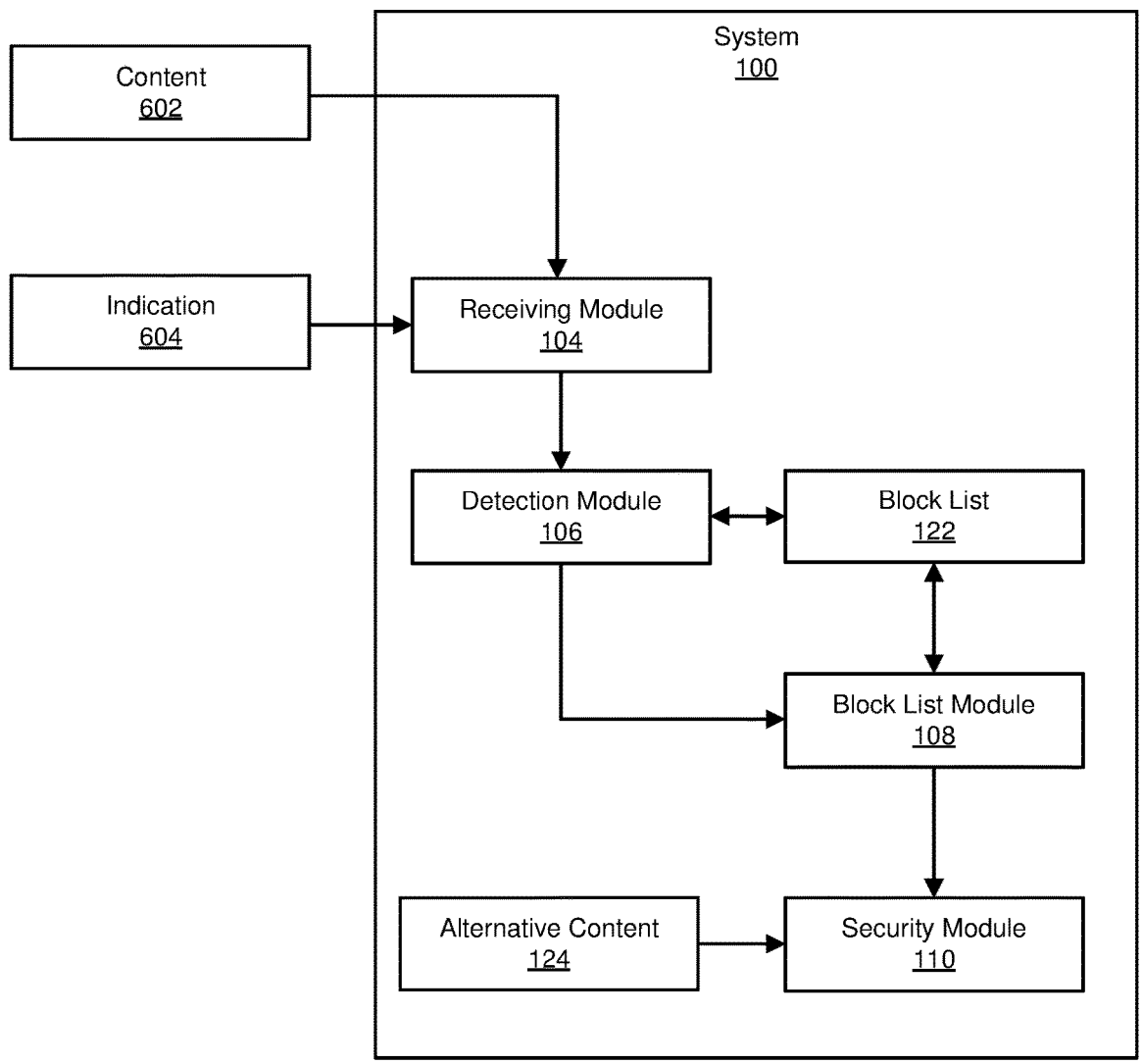
FIG. 6 is a data flow diagram of an example system for preventing display of blocked content.

FIG. 5 is a flow diagram of an example method 500 for how content is added to a block list. The steps shown in FIG. 5 may be performed by any suitable computer-executable code and/or computing system, including the system 100 in FIG. 1, the system 200 in FIG. 2, and/or variations or combinations of one or more of the same. In one example, each of the steps shown in FIG. 5 may represent an algorithm whose structure includes and/or is represented by multiple sub-steps, examples of which will be provided in greater detail below.

At step 502, one or more systems described herein may receive content to display to a user. The systems described herein may perform step 502 in any suitable manner. For example, the receiving module 104 may receive content from the content distribution platform 214. The receiving module 104 may transmit the content to the detection module 106.

At step 504, one or more systems described herein may make a determine whether the content is associated with an identifier. The systems described herein may determine whether the content is associated with an identifier in any suitable manner. For example, the detection module 106 may process the content to determine if the content is associated with an identifier. In some examples, an identifier may be stored in metadata associated with the content. The detection module 106 may process the content to detect whether an identifier is associated with the content.

If, at step 504, the systems described herein determines that the content is associated with an identifier, the method may proceed to step 506, where one or more systems described herein may add the identifier to the block list 122. The systems described herein may perform step 506 in any suitable manner. For example, the detection module 106 may obtain the identifier from the content and may transmit the identifier to the block list module 108. The block list module 108 may receive the identifier and determine whether the identifier already exists on the block list 122. If the identifier is already on the block list 122, the system may generate a notice to display to the user to indicate that the content is already on the block list 122. If the identifier is not on the block list 122, the system may add the identifier to the block list 122. In some examples, the system may generate a notification to inform the user that the content was successfully added to the block list 122. In some examples, if the user provided any additional information with the request to add the content to the block list 122 (e.g., rating for the content, categories/tags, comments, etc.), the additional information may be processed and added to the block list 122 in association with the identifier.

If, at step 504, the systems described herein determine that the content is not associated with an identifier, the method may proceed to step 508, where one or more systems described herein may generate an identifier based on data of the content. The systems described herein may perform step 506 in any suitable manner. For example, the detection module 106 may generate a unique identifier for the content based on the data in the content. For example, detection module 106 may generate a digital video fingerprint for the content by identifying, extracting, and then summarizing characteristic components of the content. The method may proceed to step 506, where the systems described herein may add the identifier generated in step 508 is added to the block list 122. The digital video fingerprint generated for the content by the detection module 106 may be compared to the block list 122. If the identifier is not on the block list 122, the system may add the identifier (e.g., digital video fingerprint) to the block list 122. In some examples, the system may generate a notification to inform the user that the content was successfully added to the block list 122. In some examples, if the user provided any additional information with the request to add the content to the block list 122 (e.g., rating for the content, categories/tags, comments, etc.), the additional information may be processed and added to the block list 122 in association with the identifier.

The example system 100 in FIG. 1 may be implemented in a variety of ways. For example, all or a portion of the example system 100 may represent portions of the system 600 in FIG. 6. As will be described in greater detail below, one or more of the modules 102 from FIG. 1 may, when executed by at least one processor of system 100, enable the system 600 to prevent display of blocked content on computing devices. For example, and as will be described in greater detail below, one or more of the modules 102 may cause the example system 600 to (i) receive, by the receiving module 104 from a content distribution platform 214, content 602 to display on the computing device 202, (ii) display, by the computing device 202, the content 602 to a user of the computing device 202, (iii) receive, by the receiving module 104 from the user, an indication 604 to block the content 602, (iv) add, by the block list module 108, the content 602 to the block list 122, based on data detected or generated by the detection module 106, (v) receive, at a later time by the receiving module 104, the content 602 to display to the user, (vi) determine, by the detection module 106, that the content 602 is on the block list 122, and (vii) in response to determining the content 602 is on the block list 122, performing, by the security module 110, a security action to prevent display of the content, such as, for example, displaying alternative content 124 in lieu of the content 602 on the block list 122.

Figure 7:
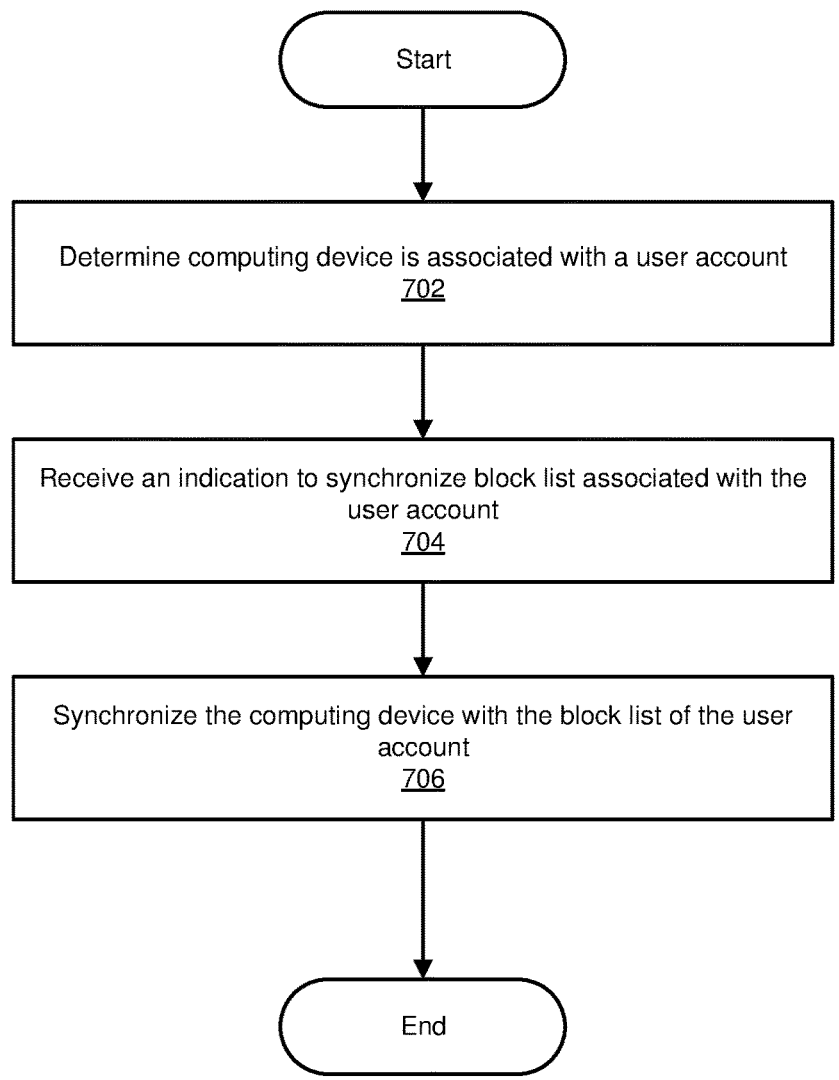
FIG. 7 is a flow diagram of an example method for synchronizing a block list across different computing devices.

FIG. 7 is a flow diagram of an example method 700 for synchronizing a block list across different computing devices. The steps shown in FIG. 7 may be performed by any suitable computer-executable code and/or computing system, including system 100 in FIG. 1, system 200 in FIG. 2, and/or variations or combinations of one or more of the same. In one example, each of the steps shown in FIG. 7 may represent an algorithm whose structure includes and/or is represented by multiple sub-steps, examples of which will be provided in greater detail below.

At step 702, one or more systems described herein may determine that the computing device 202 is associated with a user account. The systems described herein may perform step 702 in any suitable manner. For example, the detection module 106 may identify the user account associated with the computing device 202. The user account data may be stored locally on the computing device 202 or may be obtained from the user through a user interface of the computing device 202.

At step 704, one or more systems described herein may receive an indication to synchronize the block list 122 associated with the user account. The systems described herein may perform step 704 in any suitable manner. For example, receiving module 104 may receive an indication from the user, through a touchscreen interface, user interface interaction via a remote control device, or other user interface of the computing device 202, to synchronize the block 122 associated with the user account with the computing device 202. The detection module 106 may, based on the user account, identify one or more blocks lists 122 associated with the user account. In some examples, the detection module 106 may query the remote server 206, using data associated with the user account, to identify one or more block lists 122 associated with the user account.

At step 706, one or more systems described herein may synchronize the computing device 202 with the block list 122 of the user account. The systems described herein may perform step 706 in any suitable manner. For example, the block list module 108, may download or otherwise import the block list 122 from the remote server 206 to the computing device 202 and may store the block list 122 locally to the data storage 120 of the computing device 202. In some examples, any changes made to the block list 122 after importing the blocklist 122 may trigger an update to the block list 122 stored on the remote server 206 to ensure that computing devices 202 associated with the user account may be synchronized and up-to-date with the latest additions made by devices associated with the user account.

In some examples, the user may wish to remove the block list 122 from the computing device 202. The receiving module 104 may receive an indication from the user through a user interface of the computing device 202 to remove the block list 122 associated with the user account. The indication may specify that the block list 122 is to be removed from the computing device 202 but not disassociated with the user account. This may allow the user to specify and control which computing devices 202 associated with the user account utilize the block list 122 and permit the user to remove block lists 122 from certain computing devices 202 associated with the user account without deleting the block list 122.

Figure 8:
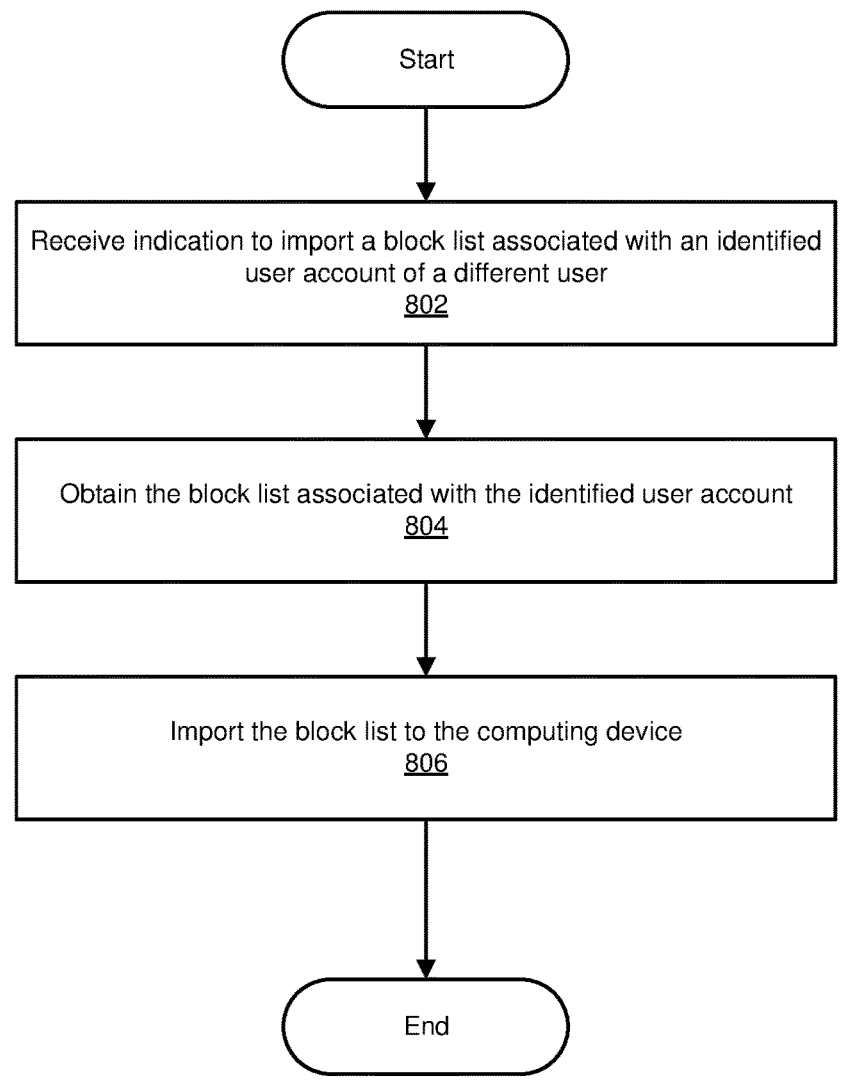
FIG. 8 is a flow diagram of an example method for importing a block list to prevent display of blocked content.

FIG. 8 is a flow diagram of an example method 800 for importing a block list to prevent display of blocked content. The steps shown in FIG. 8 may be performed by any suitable computer-executable code and/or computing system, including system 100 in FIG. 1, system 200 in FIG. 2, and/or variations or combinations of one or more of the same. In one example, each of the steps shown in FIG. 8 may represent an algorithm whose structure includes and/or is represented by multiple sub-steps, examples of which will be provided in greater detail below.

At step 802, one or more systems described herein may receive an indication to import the block list 122 associated with an identified user account of a different user. The systems described herein may perform step 802 in any suitable manner. For example, an indication may be received, by the receiving module 104, through a user interface of a computing device 202. The indication may be received in response to a user interacting with a computing device 202 (e.g., set top box) using a remote control device. In some examples, the indication may be received from a web portal associated with the user account of the user. The indication may be data indicating that an identified block list 122 is to be imported. The indication may include data specifying a location of the identified block list 122 or identifying a different user account of a different user where the block list 122 may be obtained. In some examples, the user may specify the location of the identified block list 122 or the user account from which to import the block list 122 through the interface used to indicate they wish to import the block list 122. In some examples, the user may identify the different user account based on data from a social media platform associated with the user account of the user or through a contract list associated with the user account and/or computing device 202. In some examples, the user may be able to browse a public community to identify a public block list 122 created by a user that is unknown to the user. In some examples, the user may indicate to import a block list 122 from an invitation from a known contact or social media connection, which may be received via message, social media messaging, text messaging, email, or the like.

At step 804, one or more systems described herein may obtain the block list 122 associated with the identified user account. The systems described herein may perform step 804 in any suitable manner. For example, a detection module 106 may obtain a block list identifier associated with the block list 122 the user wishes to import and/or associate with their user account. The block list module 108 may use the block list identifier to query a remote server (e.g., server 206) which may store and maintain block lists 122 for the systems described herein. The block list module 108 may obtain and/or identify the block list 122 from the remote server 206.

At step 806, one or more systems described herein may import the block list 122 to the computing device 202. The systems described herein may perform step 806 in any suitable manner. For example, block list module 108 may store the block list 122 locally on the computing device 202, such as in data storage 120. In some examples, the block list module 108 may communicate with the remote server 206 to associate the user account of the user with the requested block list 122. The computing device 202 may obtain the block list 122 data when necessary based on the association created by the block list module 108.

The systems and methods described herein are directed to preventing display of blocked content. Existing solutions for preventing display of blocked content may require manual intervention by the user, which may be prone to mishaps based on diligence and timing on the part of the user. The systems and methods described herein are directed to maintaining a list of blocked content, as indicated by a user, and using the list to prevent the display of the content on the computing devices. In some examples, the block list may be synchronized across devices associated with the same user account. The block list may also be shared with other users. The systems described herein may identify content identified to be block and in future encounters, may execute a security action, such as displaying alternative content in lieu of the content on the block list.

Figure 9:
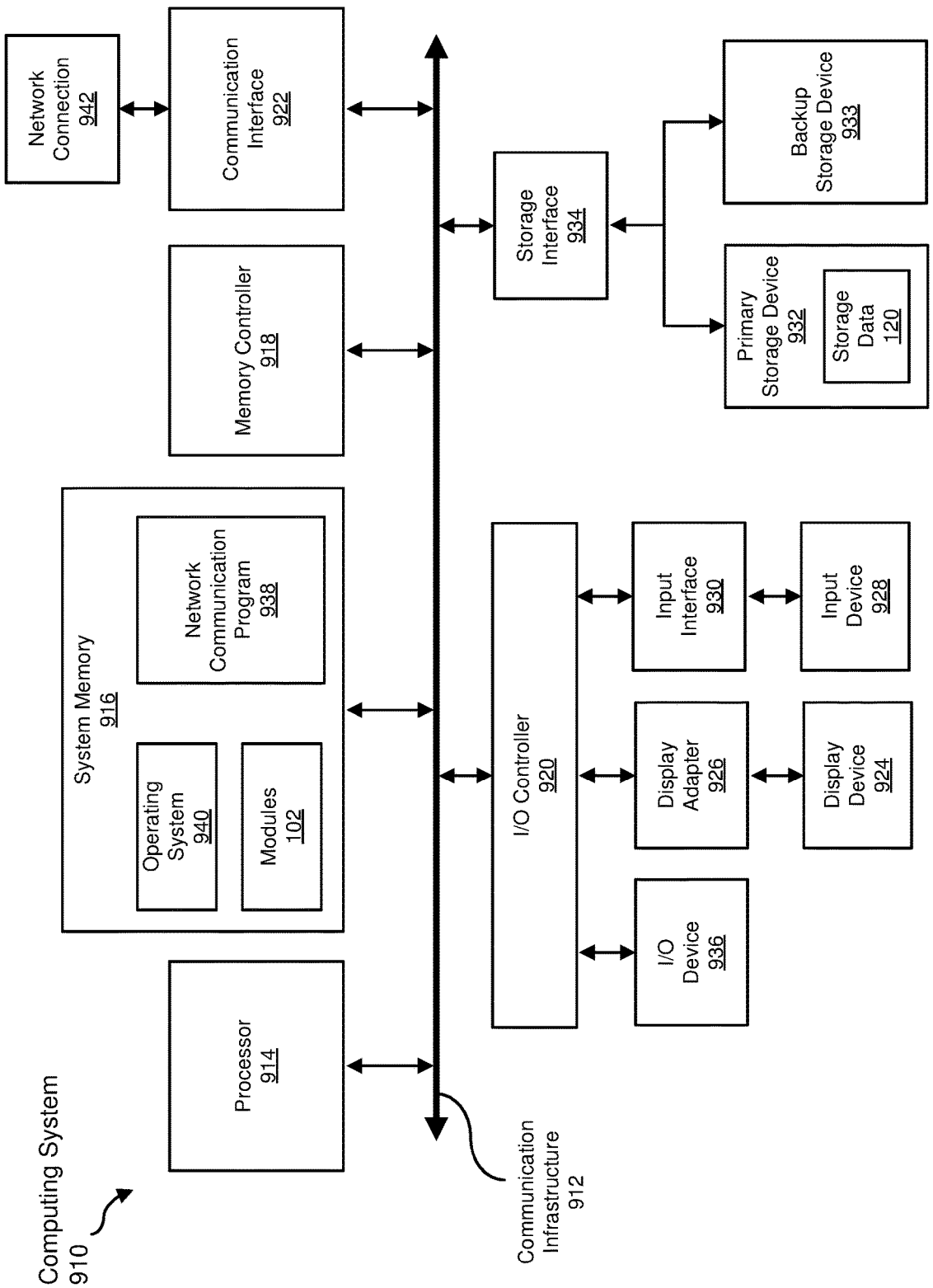
FIG. 9 is a block diagram of an example computing system capable of implementing one or more of the embodiments described and/or illustrated herein.

FIG. 9 is a block diagram of an example computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the example embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In some examples, system memory 916 may store and/or load an operating system 940 for execution by processor 914. In one example, operating system 940 may include and/or represent software that manages computer hardware and software resources and/or provides common services to computer programs and/or applications on computing system 910. Examples of operating system 940 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

As illustrated in FIG. 9, computing system 910 may also include at least one display device 924 coupled to I/O controller 920 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, example computing system 910 may also include at least one input device 928 coupled to I/O controller 920 via an input interface 930. Input device 928 generally represents any type or form of input device capable of providing input, either computer or human generated, to example computing system 910. Examples of input device 928 include, without limitation, a keyboard, a pointing device, a speech recognition device, variations or combinations of one or more of the same, and/or any other input device.

Additionally or alternatively, example computing system 910 may include additional I/O devices. For example, example computing system 910 may include I/O device 936. In this example, I/O device 936 may include and/or represent a user interface that facilitates human interaction with computing system 910. Examples of I/O device 936 include, without limitation, a computer mouse, a keyboard, a monitor, a printer, a modem, a camera, a scanner, a microphone, a touchscreen device, variations or combinations of one or more of the same, and/or any other I/O device.

Communication interface 922 broadly represents any type or form of communication device or adapter capable of facilitating communication between example computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

In some examples, system memory 916 may store and/or load a network communication program 938 for execution by processor 914. In one example, network communication program 938 may include and/or represent software that enables computing system 910 to establish a network connection 942 with another computing system (not illustrated in FIG. 9) and/or communicate with the other computing system by way of communication interface 922. In this example, network communication program 938 may direct the flow of outgoing traffic that is sent to the other computing system via network connection 942. Additionally or alternatively, network communication program 938 may direct the processing of incoming traffic that is received from the other computing system via network connection 942 in connection with processor 914.

Although not illustrated in this way in FIG. 9, network communication program 938 may alternatively be stored and/or loaded in communication interface 922. For example, network communication program 938 may include and/or represent at least a portion of software and/or firmware that is executed by a processor and/or Application Specific Integrated Circuit (ASIC) incorporated in communication interface 922.

As illustrated in FIG. 9, example computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910. In one example, [the data storage 120] from FIG. 1 may be stored and/or loaded in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 910 may be configured as an Application Specific Integrated Circuit (ASIC) adapted to implement one or more of the example embodiments disclosed herein.

Figure 10:
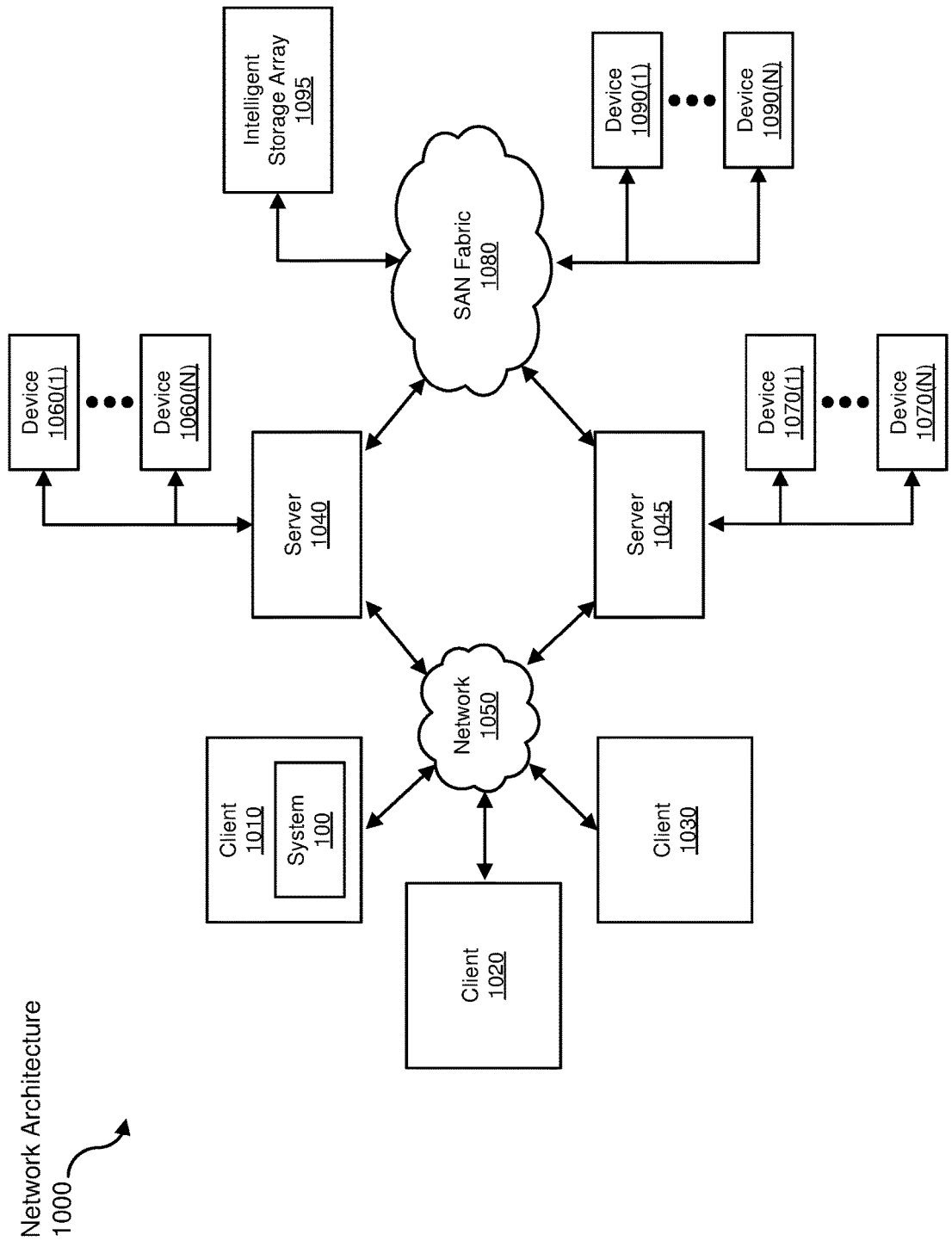
FIG. 10 is a block diagram of an example computing network capable of implementing one or more of the embodiments described and/or illustrated herein.

FIG. 10 is a block diagram of an example network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the instant disclosure.

Client systems 1010, 1020, and 1030 generally represent any type or form of computing device or system, such as example computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to example computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the example embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an example method for preventing display of blocked content.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing display of blocked content, at least a portion of the method being performed by a computing device comprising at least one processor, the method comprising:
    displaying, by the computing device, content to a user;
    receiving, from a user, an indication to block the content;
    generating a digital video fingerprint using data in the content;
    adding the content to a block list using the digital video fingerprint;
    associating a rating with the content on the block list, wherein the rating is provided by the user, and the rating corresponds to a value on a scale having a plurality of values that indicate how strongly the user feels about the content being blocked;
    receiving, at a later time, the content to display to the user;
    determining the content is on the block list; and
    in response to determining the content is on the block list, performing a security action to prevent display of the content.

2. The computer-implemented method of claim 1, wherein the security action comprises displaying, on the computing device, alternative content in lieu of the content on the block list.

3. The computer-implemented method of claim 2, wherein the alternative content comprises user-specified media content.

4. The computer-implemented method of claim 1, wherein adding the content to the block list further comprises:
    detecting an identifier associated with the content; and
    adding the identifier to the block list.

5. The computer-implemented method of claim 1, wherein generating the digital video fingerprint further comprises:
    extracting a characteristic component of the content; and
    generating the digital video fingerprint using the characteristic component of the content.

6. The computer-implemented method of claim 1, further comprising:
    associating a comment with the content on the block list, wherein the comment is provided by the user, and the comment corresponds to notes that may be useful for the user or other users to review why the content was blocked or to indicate what the content is about.

7. The computer-implemented method of claim 1, wherein the computing device is associated with a user account, a different computing device is associated with the user account, and the method further comprises:
    synchronizing, based on the user account, the block list on computing device and the different computing device.

8. The computer-implemented method of claim 1, further comprising:
   importing the block list from a remote computing device, wherein remote computing device is associated with a different user account.

9. The computer-implemented method of claim 8, wherein the different user account is associated with a user account of the computing device through a social media platform or through a contact list on the computing device.

10. A system for preventing display of blocked content, the system comprising:
   at least one physical processor;
   physical memory comprising computer-executable instructions that, when executed by the physical processor, cause the physical processor to:
      display content to a user of a computing device;
      receive, from a user, an indication to block the content;
      generate a digital video fingerprint using data in the content;
      add the content to a block list using the digital video fingerprint;
      associate a rating with the content on the block list, wherein the rating is provided by the user, and the rating corresponds to a value on a scale having a plurality of values that indicate how strongly the user feels about the content being blocked;
      receive, at a later time, the content to display to the user;
      determine the content is on the block list; and
      in response to determining the content is on the block list, perform a security action to prevent display of the content.

11. The system of claim 10, wherein the security action comprises displaying, alternative content in lieu of the content on the block list.

12. The system of claim 11, wherein the alternative content comprises user-specified media content.

13. The system of claim 10, wherein, to add the content to the block list, the computer-executable instructions further cause the physical processor to:
   detect an identifier associated with the content; and
   add the identifier to the block list.

14. The system of claim 10, wherein, to generate the digital video fingerprint, the computer-executable instructions further cause the physical processor to:
   extract a characteristic component of the content; and
   generate the digital video fingerprint using the characteristic component of the content.

15. The system of claim 10, wherein the instructions further cause the physical processor to associate a comment with the content on the block list, wherein the comment is provided by the user, and the comment corresponds to notes that may be useful for the user or other users to review why the content was blocked or to indicate what the content is about.

16. The system of claim 10, wherein the computing device is associated with a user account, a different computing device is associated with the user account, and wherein the computer-executable instructions further cause the physical processor to:
   synchronize, based on the user account, the block list on the computing device and the different computing device.

17. The system of claim 10, wherein the computer-executable instructions further cause the physical processor to:
   import the block list from a remote computing device, wherein remote computing device is associated with a different user account.

18. The system of claim 17, wherein the different user account is associated with a user account of the computing device through a social media platform or through a contact list on the computing device.

19. A non-transitory computer-readable medium comprising one or more computer-executable instructions that, when executed by at least one processor of a computing device, cause the computing device to:
   display content to a user;
   receive, from a user, an indication to block the content;
   generate a digital video fingerprint using data in the content;
   add the content to a block list using the digital video fingerprint;
   associate a rating with the content on the block list, wherein the rating is provided by the user, and the rating corresponds to a value on a scale having a plurality of values that indicate how strongly the user feels about the content being blocked;
   receive, at a later time, the content to display to the user;
   determine the content is on the block list; and
   in response to determining the content is on the block list, perform a security action to prevent display of the content.

20. The non-transitory computer-readable medium of claim 19, wherein the security action comprises displaying, on the computing device, alternative content in lieu of the content on the block list.

* * * * *